United States Patent
Suh et al.

(10) Patent No.: US 12,296,745 B2
(45) Date of Patent: May 13, 2025

(54) METHOD AND APPARATUS FOR RECOGNIZING EMERGENCY VEHICLE

(71) Applicants: Hyundai Motor Company, Seoul (KR); Kia Corporation, Seoul (KR)

(72) Inventors: Jung Seok Suh, Yongin-si (KR); Hae Seong Jeong, Saha-gu (KR); Mi Jin Chung, Seoul (KR); Ja Yoon Goo, Anyang-si (KR); Hong Gyu Lee, Goyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 65 days.

(21) Appl. No.: 18/321,453

(22) Filed: May 22, 2023

(65) Prior Publication Data
US 2024/0174168 A1   May 30, 2024

(30) Foreign Application Priority Data
Nov. 24, 2022  (KR) .......................... 10-2022-0159772

(51) Int. Cl.
*B60Q 1/52*   (2006.01)
*H04W 4/40*   (2018.01)

(52) U.S. Cl.
CPC ............... *B60Q 1/52* (2013.01); *H04W 4/40* (2018.02); *B60Q 2400/50* (2013.01)

(58) Field of Classification Search
CPC ........ B60Q 1/52; B60Q 2400/50; H04W 4/40
See application file for complete search history.

(56) References Cited

U.S. PATENT DOCUMENTS

| 10,351,054 B2* | 7/2019 | Rodriguez Barros ... B60Q 1/22 |
| 2002/0175830 A1* | 11/2002 | Hudson ................ G08G 1/0955 340/908 |
| 2009/0013922 A1* | 1/2009 | Lin ......................... B60Q 1/44 116/28 R |
| 2018/0312104 A1* | 11/2018 | Albou ................... F21S 41/663 |

(Continued)

FOREIGN PATENT DOCUMENTS

| JP | 2008-155767 | 7/2008 |
| KR | 10-2015-0133534 | 11/2015 |

(Continued)

OTHER PUBLICATIONS

GB2517790 (Year: 2015).*

*Primary Examiner* — Thomas D Alunkal
(74) *Attorney, Agent, or Firm* — Fish & Richardson P.C.

(57) ABSTRACT

The present disclosure provides a method and an apparatus for recognizing an emergency vehicle. An apparatus for recognizing an emergency vehicle is provided, including a processor; and a memory configured to store at least one instruction executed by the processor. The processor is configured to control at least one or more sensors to recognize an approach of the emergency vehicle and a road condition, to determine an first avoidance location that is a location for an first car to move away from the emergency vehicle based on the road condition, to provide a first avoidance route that is a route for the first cat to move from a current location to the first avoidance location, and to control at least one projection device to project at least one of a first symbol indicating the approaching of the emergency vehicle or the first avoidance route.

19 Claims, 9 Drawing Sheets

(56) References Cited

U.S. PATENT DOCUMENTS

| | | | |
|---|---|---|---|
| 2019/0039613 A1* | 2/2019 | Lee | G08G 1/167 |
| 2019/0051169 A1* | 2/2019 | Gomez Gutierrez | G08G 1/0965 |
| 2020/0245109 A1 | 7/2020 | Yang et al. | |
| 2020/0276973 A1 | 9/2020 | Meijburg et al. | |
| 2021/0387639 A1* | 12/2021 | Chintala | G08G 1/017 |
| 2023/0162595 A1* | 5/2023 | Seder | G08G 1/096716 |
| | | | 701/428 |

FOREIGN PATENT DOCUMENTS

| KR | 10-2019-0014871 | 2/2019 |
|---|---|---|
| KR | 10-2013-0092129 | 7/2020 |
| KR | 10-2020-0139060 | 12/2020 |
| KR | 10-2247023 | 5/2021 |
| KR | 10-2022-0047438 | 4/2022 |

* cited by examiner

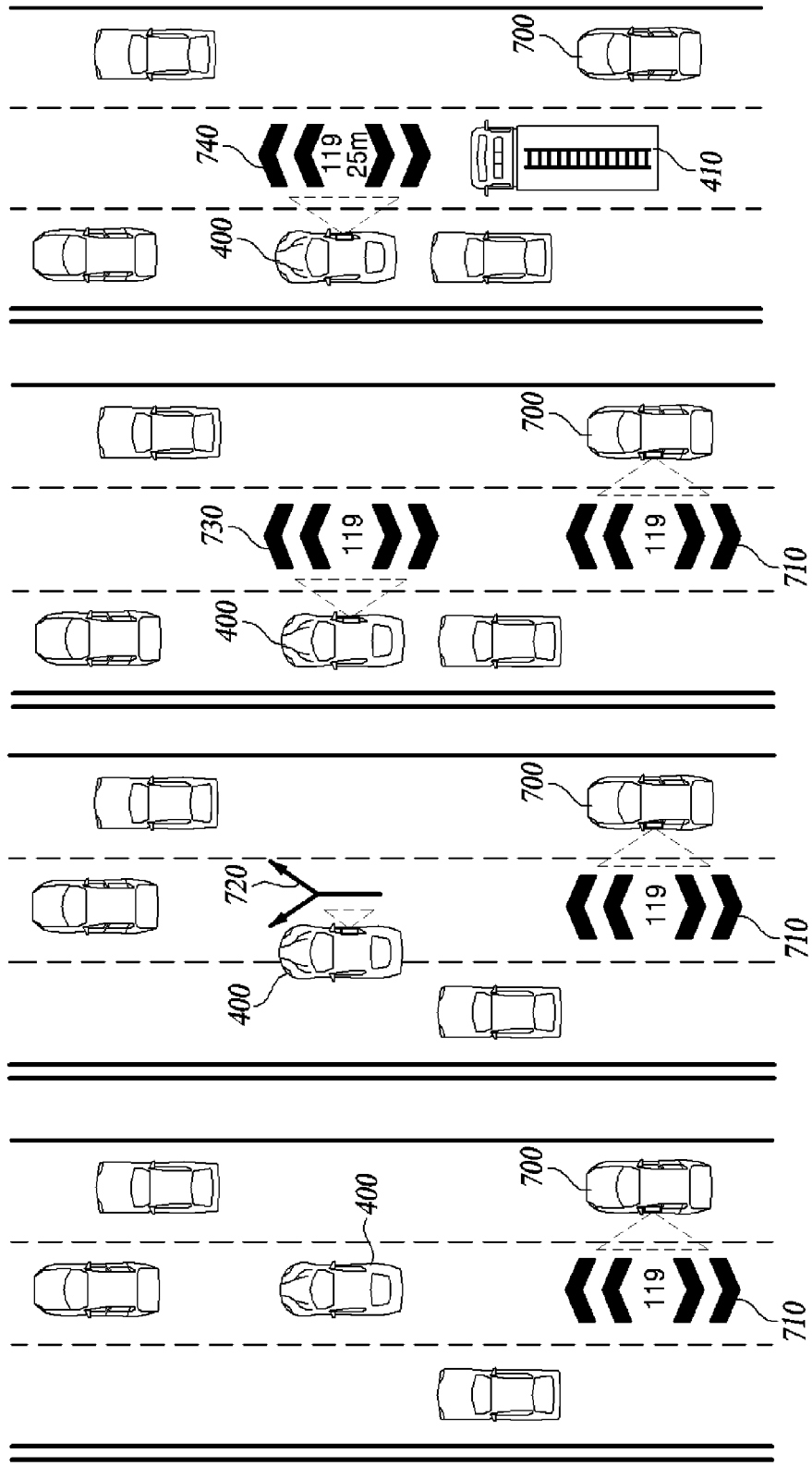

METHOD AND APPARATUS FOR RECOGNIZING EMERGENCY VEHICLE

CROSS-REFERENCE TO RELATED APPLICATIONS

The present application is based on, and claims priority to, Korean Patent Application Number 10-2022-0159772, filed Nov. 24, 2022, the disclosure of which is incorporated by reference herein in its entirety.

TECHNICAL FIELD

The present disclosure is related to a method and an apparatus for recognizing an emergency vehicle.

BACKGROUND

To secure an emergency route through which an emergency vehicle can quickly travel, a conventional technology recognizes an emergency vehicle and provides an avoidance location for nearby vehicles to go to temporarily. For example, the emergency vehicle may refer to a vehicle used for work that requires urgent attention, such as lifesaving or firefighting. By way of further example, emergency vehicles include ambulances, police cars, fire trucks, and tow cars, and are equipped with sirens and/or warning lamps. An emergency route is a temporary route that is permitted exclusively to emergency vehicles in an emergency and may be all or part of a road irrespective of a specific lane or line.

When an emergency vehicle exists in a location out of the detection range of a sensor or when the emergency vehicle is occluded by surrounding vehicles and road facilities, the sensor cannot recognize the emergency vehicle. This is problematic in that the driver of a vehicle fails to correctly recognize the real-time location of the emergency vehicle or recognizes the emergency vehicle belatedly only after adjacent vehicles move to the avoidance location.

Additionally, with no information on an emergency exchanged between neighboring vehicles, an emergency route may not be secured because each of the surrounding vehicles move disorderly according to arbitrary judgments. The failure to secure an optimal emergency route incapacitates the emergency vehicle's swift maneuver.

SUMMARY

An aspect of the present disclosure provides an emergency-vehicle recognition apparatus including a processor, and a memory configured to store at least one instruction executed by the processor. The processor is configured to control at least one sensor to recognize an approach of the emergency vehicle and a road condition, to determine a first avoidance location that is an avoidance location for a first car to move away from the emergency vehicle based on the road condition, to provide a first avoidance route that is a route for the first car to move from a current location to the first avoidance location, and to control at least one projection device to project one or both of a first symbol indicating the approaching of the emergency vehicle and the first avoidance route.

Another aspect of the present disclosure provides an emergency situation control apparatus using vehicle-to-everything (V2X) communications, including a transceiver, a processor, and a memory configured to store at least one instruction executed by the processor. The processor is configured to control the transceiver to receive, from an emergency vehicle, a current location and destination of the emergency vehicle, and receive, from one or more emergency-vehicle recognition apparatuses surrounding the emergency vehicle, one or more road conditions, to predict an emergency route that is a fastest route for the emergency vehicle to the destination based on the current location, the destination, and the one or more road conditions, and to control the transceiver to transmit the emergency route to the emergency vehicle and the one or more emergency-vehicle recognition apparatuses.

Another aspect of the present disclosure provides a method of recognizing an emergency vehicle, including recognizing an approach of the emergency vehicle and a road condition by using at least one or more sensors, determining a first avoidance location that is an avoidance location for an first car to move away from the emergency vehicle based on the road condition, providing a first avoidance route that is a route for the first car to move from a current location to the first avoidance location, and projecting, by using at least one projection device, one or both of a first symbol indicating the approaching of the emergency vehicle and the first avoidance route.

BRIEF DESCRIPTION OF THE DRAWINGS

FIG. 7A to 7D are diagrams illustrating an example of vehicles providing surrounding vehicles with alarm messages about an emergency step by step.

DETAILED DESCRIPTION

Aspects of the present disclosure provide an emergency-vehicle recognition apparatus that can project a symbol indicating the approach of an emergency vehicle.

Another aspect of the present disclosure provides an emergency-vehicle recognition apparatus that can share information on an emergency with other emergency-vehicle recognition apparatuses by using V2X communications.

Figure 1:
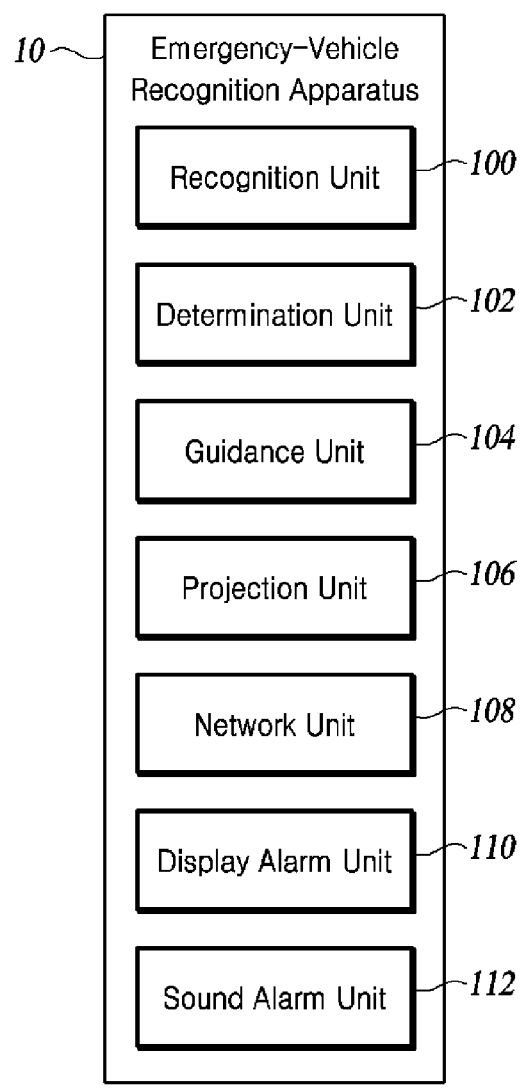
FIG. 1 is a block diagram of a configuration of an emergency-vehicle recognition apparatus.

FIG. 1 is a block diagram of a configuration of an emergency-vehicle recognition apparatus 10.

As shown in FIG. 1, the emergency-vehicle recognition apparatus 10 may include all or some of a recognition unit 100, a determination unit 102, a guidance unit 104, a projection unit 106, a network unit 108, a display alarm unit 110, and a sound alarm unit 112.

The recognition unit 100 utilizes one or more sensors to recognize a situation in which an emergency vehicle approaches. Here, the sensor may include a camera, a radar, a lidar, an ultrasonic sensor, and a voice recognition sensor. For example, the recognition unit 100 may recognize the shape of an emergency vehicle using a camera or recognize a situation in which an emergency vehicle is approaching based on a siren of the emergency vehicle using a voice recognition sensor. The recognition unit 100 may recognize the type of emergency vehicle. Types of emergency vehicles may include, for example, ambulances, fire engines, police cars, and/or tow trucks.

In some implementations, the recognition unit 100 may recognize information on an emergency vehicle based on information projected on a road surface by another vehicle. The information on the emergency vehicle may identify the type and location of the emergency vehicle, the emergency route of the emergency vehicle, and/or the direction (or lane) to which the ego-car should move to secure the emergency route. Here, the ego-car may be a vehicle including the emergency-vehicle recognition apparatus 10, and one or more other vehicles may be vehicles including one or more other emergency-vehicle recognition apparatuses. In some implementations, the other vehicles may be ordinary vehicles that do not include the other emergency-vehicle recognition apparatuses.

The determination unit 102 determines an avoidance location to which the ego-car should move to secure an emergency route for the emergency vehicle based on real-time road conditions recognized by the sensor. Real-time road conditions include the real-time location of the emergency vehicle, movements of other vehicles, road facilities, lanes and lines, and the like. The avoidance location is a location to which the ego-car should temporarily move while the emergency vehicle is traveling on the emergency route.

Meanwhile, in response to the recognition unit 100 recognizing another symbol and/or another avoidance route projected by another vehicle, the determination unit 102 may determine the avoidance location for the ego-car based on the direction indicated by at least one of the other symbol or the other avoidance route. For example, another vehicle may project an arrow-shaped image on the road surface to lead other vehicles to the right lanes, and in response, the determination unit 102 may determine a location within the lane to the right of the lane the ego-car is traveling in as its avoidance location. The guidance unit 104 may guide an avoidance route for the ego-car to take from its real-time location to the avoidance location. The guidance unit 104 may guide the driving direction, speed, and the like from the real-time location of the ego-car towards the avoidance location for the ego-car. The guidance unit 104 may visually output the avoidance route using a Graphical User Interface (GUI), and may provide voice guidance using an Auditory User Interface (AUI). For example, the guidance unit 104 may use the GUI to visually output a map displaying the real-time location and avoidance location for the ego-car and/or a guide message prompting the driver to drive to the avoidance location. Additionally, the guidance unit 104 may use the AUI to provide a voice message for guiding the direction and speed for moving from the real-time location of the ego-car to the avoidance location.

In response to the recognition unit 100 recognizing that the emergency vehicle has overtaken the ego-car, the guidance unit 104 may provide a guide on the emergency being terminated and to return to normal driving. Here, a guide to return to normal driving refers to, for example, guiding a return route from an avoidance location to an original location or guiding a route toward the nearest lane from the avoidance location.

Meanwhile, the guidance unit 104 may receive an input of approval or disapproval of avoidance route guidance by using a GUI device. When the user inputs approval of the avoidance route guidance, the guidance unit 104 guides the avoidance route, but when the user inputs disapproval of the avoidance route guidance, the guidance unit 104 may end the avoidance route guidance.

When the ego-car is an autonomous vehicle, the guidance unit 104 may receive a user's approval and/or disapproval to yield the right of way through an avoidance route using the GUI device. For example, when the user inputs an approval of yielding, the ego-car may yield the right of way by driving into the avoidance route. As another example, when the user skips inputting disapproval of yielding, the ego-car may yield the right of way by driving into the avoidance route. As another example, when the user inputs disapproval of yielding, the ego-car may cancel the yielding and return to normal driving.

The projection unit 106 may use at least one projection device to project a symbol indicating that an emergency vehicle is approaching. Here, the symbol indicating that an emergency vehicle is approaching may include a sign or symbol indicating that there is an emergency vehicle. The projection unit 106 may project symbols of different shapes according to the type of emergency vehicle. For example, upon encountering an ambulance, a symbol including a cross may be projected, and in the case of a fire truck, a symbol including the number 911 or such may be projected. This symbol may include the relative distance and/or direction of the emergency vehicle based on the location of the ego-car. The projected symbol may be displayed on a road surface, road facility, surrounding vehicles, and others (hereinafter referred to as 'road surface and the like'). With the projection unit 106 projecting a symbol through a projection device, other emergency-vehicle recognition apparatuses and/or drivers of other vehicles can easily recognize the approach of an emergency vehicle based on the symbol.

The projection unit 106 may project an avoidance route onto a road surface and the like by using at least one projection device. With the projection unit 106 projecting the avoidance route onto the road surface and the like, other emergency-vehicle recognition apparatuses and/or drivers of other vehicles can easily recognize the direction or route for the other vehicles to take based on the projected avoidance route. The projection unit 106 may simultaneously project a symbol and an avoidance route by using one or more projection devices. For example, the projection unit 106 may project an avoidance route by using a projection device mounted on the front of the vehicle and simultaneously project a symbol by using a projection device mounted on the side of the vehicle.

In response to the recognition unit 100 recognizing other symbols and/or other avoidance routes projected by other vehicles, the projection unit 106 may determine the shape of at least one of the symbol or the avoidance route and/or determine a location to project the at least one of the symbol or the avoidance route to provide surrounding vehicles with information consistent with information projected by other vehicles. Details on this process will be described below with reference to FIGS. 7 and 8.

The network unit 108 may exchange information with an emergency situation control apparatus and/or other emergency-vehicle recognition apparatuses by using Vehicle to Everything (V2X) communications. Here, V2X communications refer to a communication technology that allows a vehicle to exchange information with other vehicles and/or road infrastructure by using a wired or wireless network.

The emergency situation control apparatus may predict an emergency route based on the real-time location and destination of the emergency vehicle, and real-time road conditions, and transmit the predicted emergency route to the emergency vehicle and a plurality of emergency-vehicle recognition apparatuses.

The network unit 108 may transmit the avoidance location for the ego-car to other emergency-vehicle recognition apparatuses and may receive the avoidance location for other vehicles from other emergency-vehicle recognition apparatuses. The network unit 108 may transmit the real-time road conditions recognized by the recognition unit 100 to the emergency situation control apparatus and may receive an emergency route from the emergency situation control apparatus. In response to the network unit 108 receiving the emergency route and the avoidance location for other vehicles, the determination unit 102 may further take into account the emergency route and the avoidance location for other vehicles to determine the avoidance location for the ego-car.

The display alarm unit 110 may use one or more display devices to visually output a message, for example a text message, that an emergency vehicle is approaching. Here, one or more display devices may be mounted on the front, rear, left, and right sides of vehicles. The front display device may output a mirrored text message. Here, mirroring is an operation to display a mirror image of a figure by reversing all or part of a displayed element. The reason the front display device outputs a mirrored text message is because of the characteristics of a mirror. When a leading vehicle driver sees objects with the side-view mirror or rear-view mirror, the objects are displayed with the left and right reversed on each mirror, which prevents the leading vehicle driver who looks at the object through each mirror from seeing the original image. Therefore, a second-time mirroring of the already mirrored and outputted text message to be displayed on the leading vehicle mirrors will appear as the correct original text message for the driver looking at the mirrors to quickly recognize an emergency happening behind.

The sound alarm unit 112 may use one or more sound devices to audibly output a message indicating that an emergency vehicle is approaching. For example, the volume of the output may be similar to that of a car horn, which may be arbitrarily set by a setter.

Figure 2:
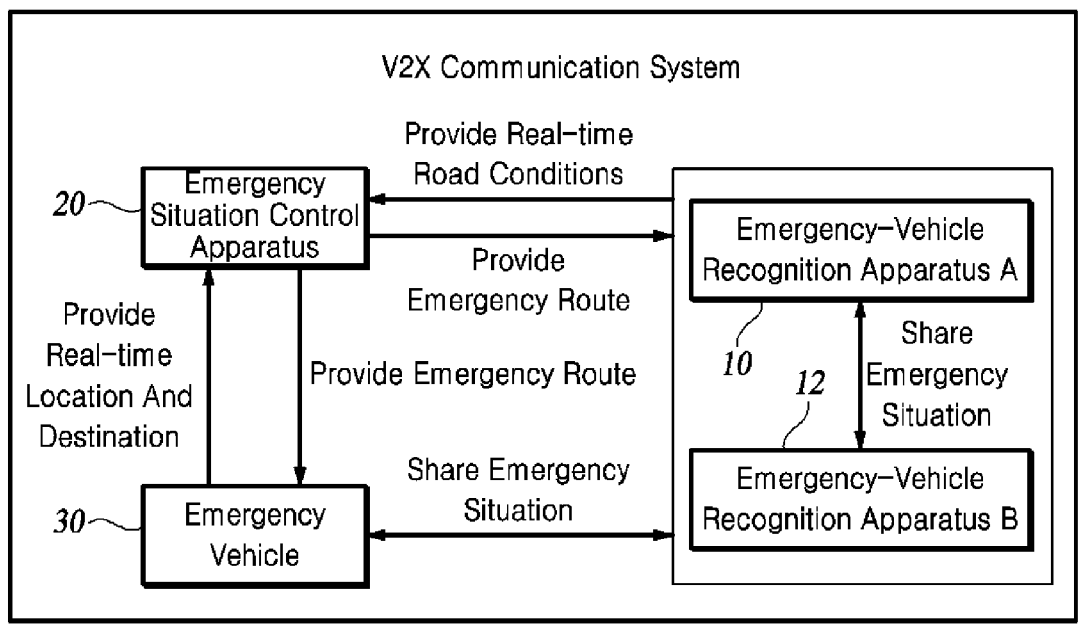
FIG. 2 is a diagram illustrating a process of sharing data of an emergency by using a V2X communication system.

FIG. 2 is a diagram illustrating a process of sharing data of an emergency by using a V2X communication system.

As shown in FIG. 2, an emergency-vehicle recognition apparatus A 10 and an emergency-vehicle recognition apparatus B 12 may share information on an emergency. For example, when the distance between emergency-vehicle recognition apparatus A 10 and the emergency vehicle is 10 m and the distance between emergency-vehicle recognition apparatus B 12 and the emergency vehicle is 100 m, emergency-vehicle recognition apparatus B 12 may fail to recognize the emergency vehicle. In this case, emergency-vehicle recognition apparatus A 10 may provide emergency-vehicle recognition apparatus B 12 with information indicating that the emergency vehicle is approaching. Although only emergency-vehicle recognition apparatus A 10 and emergency-vehicle recognition apparatus B 12 are shown in FIG. 2, the present disclosure is intended to be inclusive of all apparatuses existing around the emergency route.

An emergency situation control apparatus 20 may include all or some of a transceiver, and processor, and a memory configured to store at least one instruction executed by the processor. The processor may be configured to control the transceiver to receive the real-time location and destination of the emergency vehicle from an emergency vehicle 30 and to receive real-time road conditions from one or more emergency-vehicle recognition apparatuses. The processor may be configured to generate the fastest emergency route for an emergency vehicle to take based on the received information. The processor may be configured to control the transceiver to transmit the emergency route to the emergency vehicle 30 and/or the emergency-vehicle recognition apparatuses 10 and 12.

Figure 3:
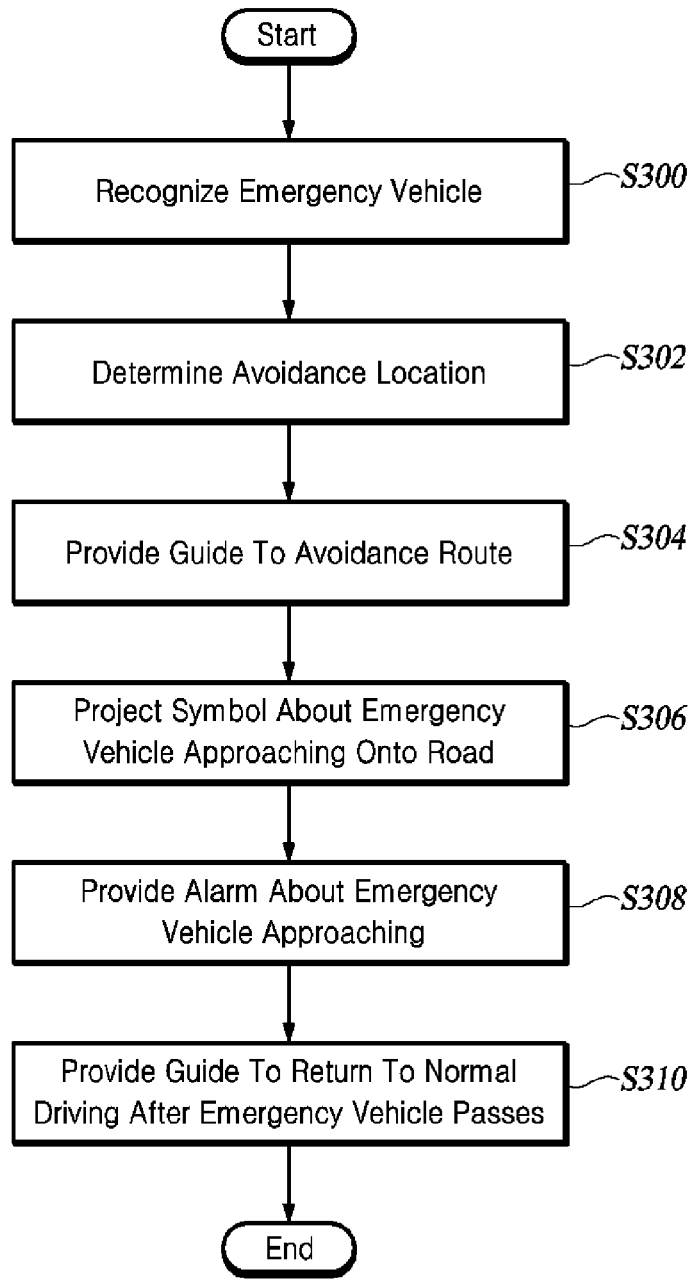
FIG. 3 is a flowchart of an emergency-vehicle recognition method.

FIG. 3 is a flowchart of an emergency-vehicle recognition method.

As shown in FIG. 3, the recognition unit 100 recognizes the approach of an emergency vehicle and real-time road conditions by using one or more sensors (S300).

The determination unit 102 determines the avoidance location for the ego-car based on real-time road conditions (S302).

The guidance unit 104 provides a guide to an avoidance route from the real-time location of the ego-car to the avoidance location for the ego-car (S304).

The projection unit 106 projects a symbol for the approach of the emergency vehicle onto the road surface (S306).

The display alarm unit 110 visually outputs a message indicating that an emergency vehicle is approaching, and the sound alarm unit 112 audibly outputs the same message (S308).

In response to the recognition unit 100 recognizing that the emergency vehicle has overtaken the ego-car, the guidance unit 104 guides the ego-car to return to normal driving (S310).

Figure 4A:
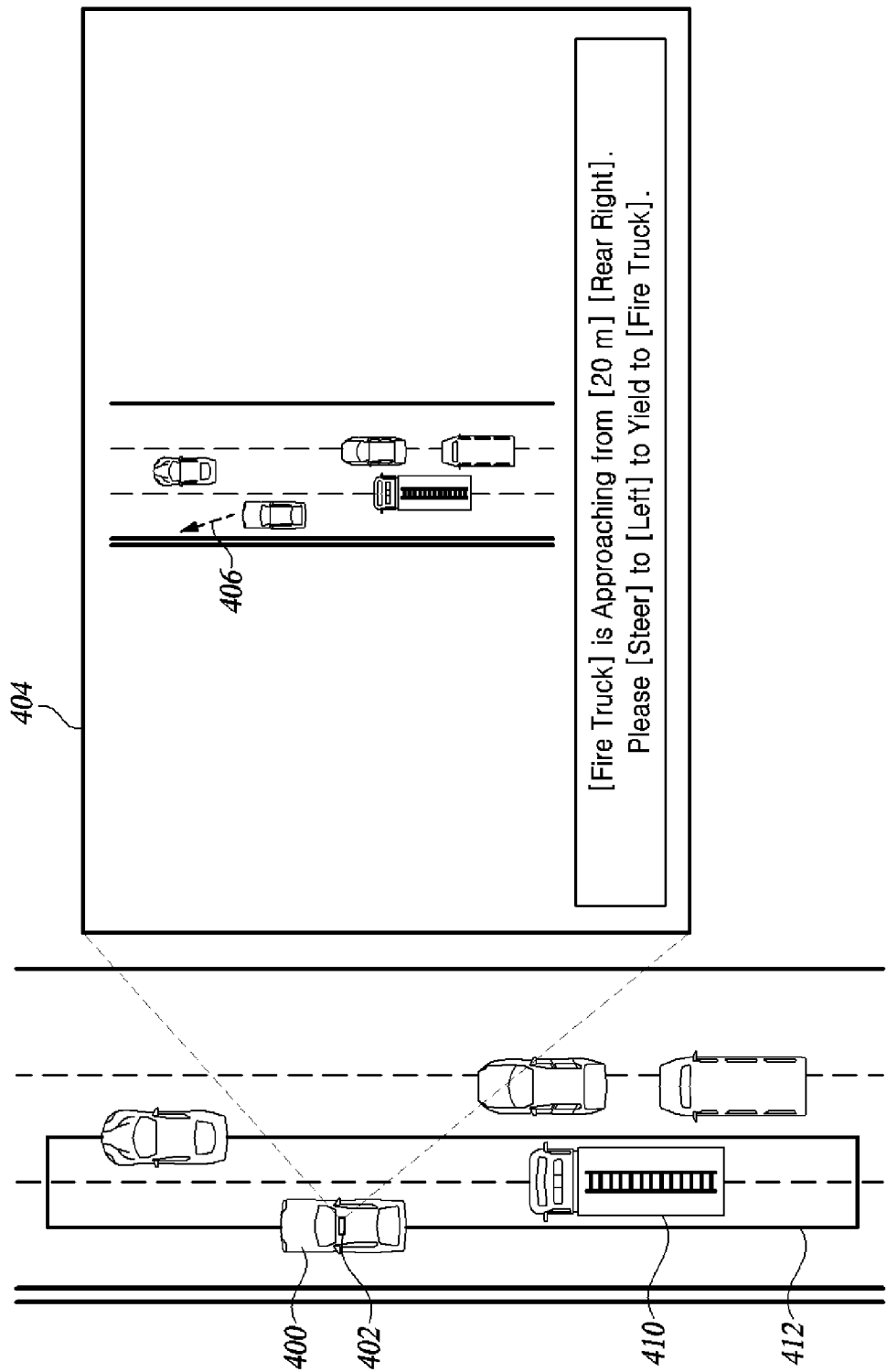
FIGS. 4A and 4B are diagrams illustrating processes performed by an emergency-vehicle recognition apparatus for providing a guide to an avoidance route.
Figure 4B:
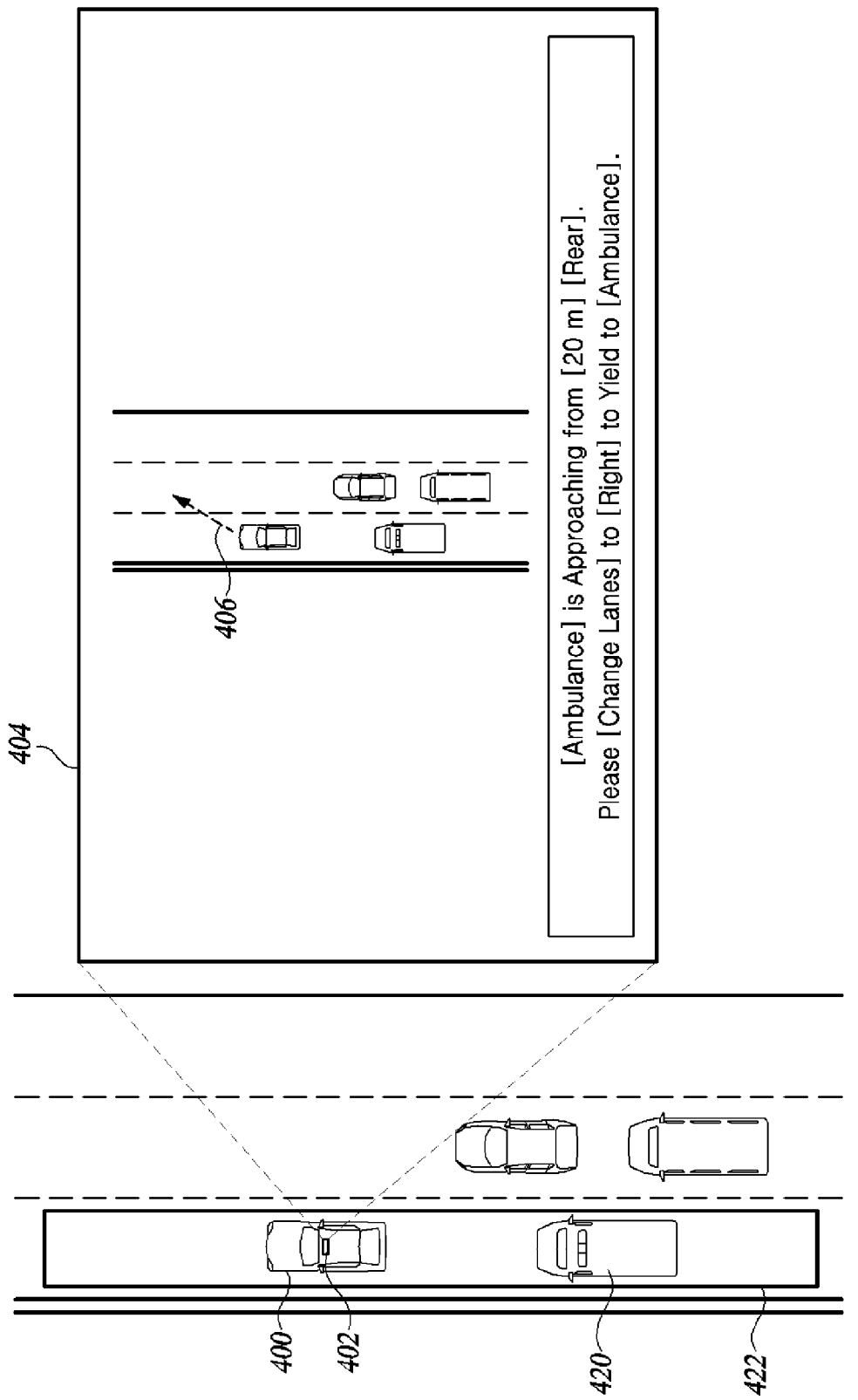

FIGS. 4A and 4B are diagrams illustrating processes performed by an emergency-vehicle recognition apparatus for providing a guide to an avoidance route.

As shown in FIG. 4A, an ego-car 400 is traveling on the first lane, and at the right rear of the ego-car 400, a fire truck 410 is driving on an emergency route 412 including the boundary line between the first lane and the second lane. In this case, the guidance unit 104 may use a GUI device 402 to output on a screen 404 a message that a fire truck is approaching and to drive by veering to the left and/or an avoidance route of the ego-car.

In FIG. 4B, the ego-car 400 and an ambulance 420 are traveling on the first lane. In this case, since the emergency route 412 is the first lane, the guidance unit 104 may use the GUI device 402 to output on the screen 404 a message that the ambulance is approaching from the rear and to drive toward the right lane and/or an avoidance route of the ego-car.

On the other hand, in the above examples, when the ego-car 400 is an autonomous vehicle, the guidance unit 104 may use the GUI device 402 to output on the screen a message informing that the vehicle is planning to drive by veering to the left and/or a message informing that the vehicle is planning to change lanes to the right lane.

Figure 5C:
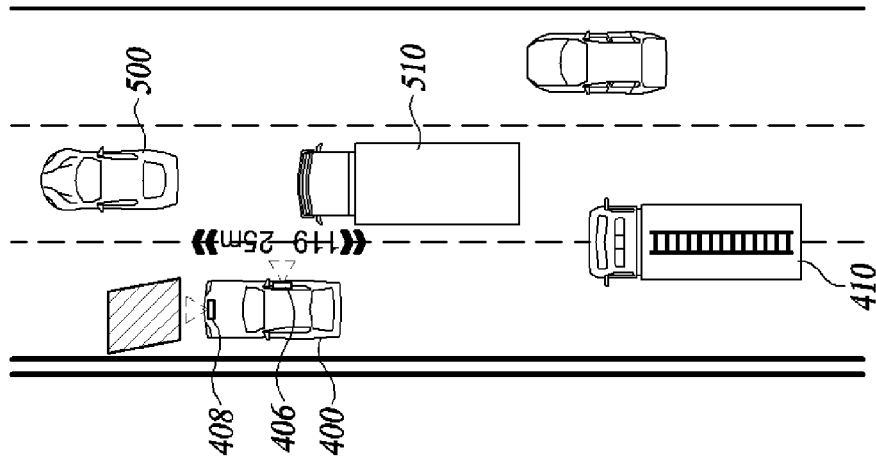
FIG. 5A to 5C are diagrams illustrating processes performed by an emergency-vehicle recognition apparatus for projecting a symbol for an emergency and/or an avoidance route onto a road surface by using a projection device.
Figure 5B:
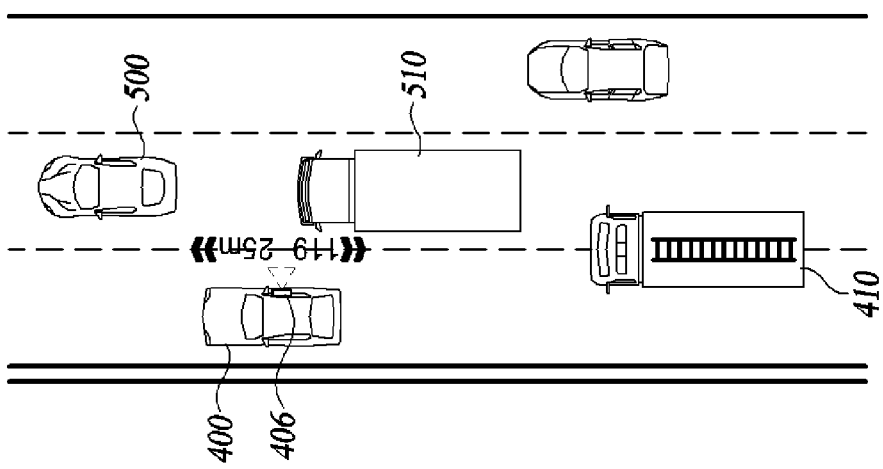
Figure 5A:
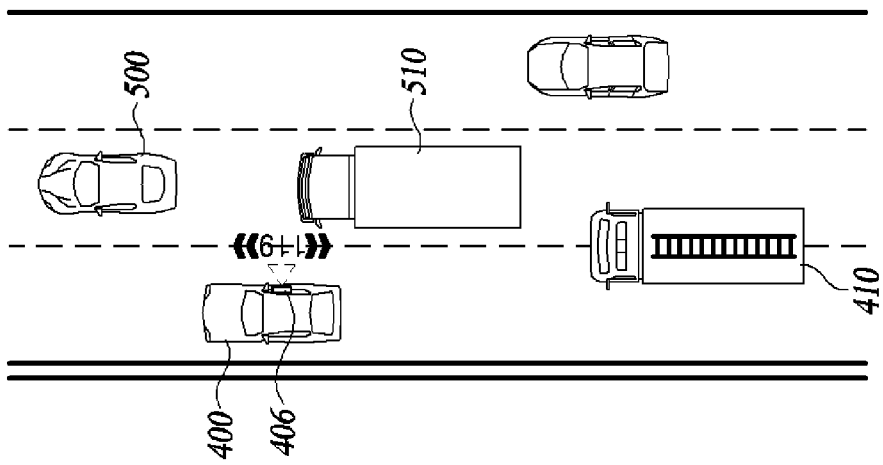

FIG. 5A to 5C are diagrams illustrating processes performed by an emergency-vehicle recognition apparatus for projecting a symbol for an emergency and/or an avoidance route onto a road surface by using a projection device.

As shown in FIG. 5A, the ego-car 400 can recognize the fire truck 410, while another vehicle 500 cannot recognize the fire truck 410 because of a truck 510. In this case, the projection unit 106 of the ego-car 400 may use a side projection device 406 to project the symbol of the fire truck onto the road surface. Based on the projected symbol, the other vehicle 500 may recognize the presence of the fire truck 410.

In FIG. 5B, the projection unit 106 of the ego-car 400 may project the symbol and a relative distance onto the road surface by using the side projection device 406. Based on the projected symbol and the relative distance, the other vehicle 500 can recognize the presence and location of the fire truck 410.

In FIG. 5C, the projection unit 106 of the ego-car 400 may project the symbol and the relative distance by using the side projection device 406 and may project an avoidance route as a guide for the other vehicle 500 onto the road surface by using a front projection device 408. For example, the projection unit 106 may use the front projection device 408 to project an arrow on the road surface guiding to drive veering to the right. Based on the projected symbol, the relative distance, and the avoidance route, the other vehicle 500 can recognize the existence, location, and emergency route of the fire truck and/or the direction for the other vehicle 500 to follow to secure emergency route for the fire truck.

Figure 6:
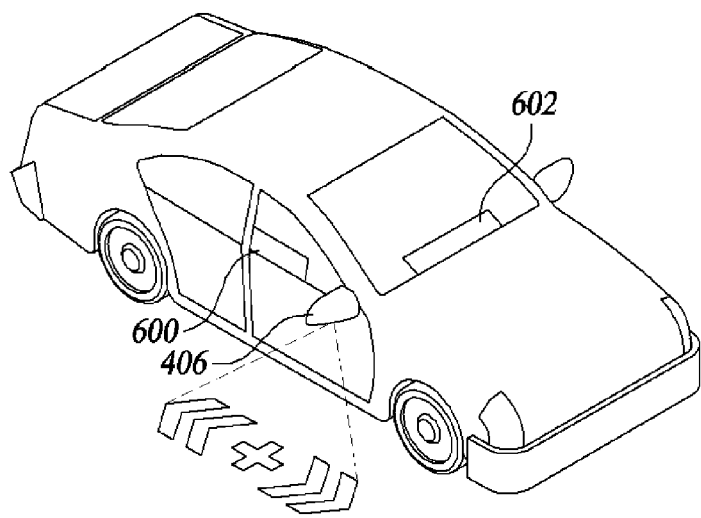
FIG. 6 is a diagram illustrating a process performed by an emergency-vehicle recognition apparatus for providing an alarm message about an emergency to surrounding vehicles.

FIG. 6 is a diagram illustrating a process performed by an emergency-vehicle recognition apparatus for providing an alarm message about an emergency to surrounding vehicles.

As shown in FIG. 6, the display alarm unit 110 may output a text message indicating that an ambulance is approaching by using a side display device 600 and a front display device 602. In this case, the front display device 602 may output the mirrored text message to allow the leading vehicle's driver to quickly recognize the message.

The projection unit 106 may project the ambulance symbol onto the road surface by using the side projection device 406. FIG. 6 illustrates a projection of the ambulance symbol only on the side of the ego-car, but the projection unit 106 may use one or more projection devices to project the symbol onto the road surface in front of and/or behind the ego-car.

FIG. 7A to 7D are diagrams illustrating an example of vehicles providing surrounding vehicles with alarm messages about an emergency step by step.

FIG. 7A to 7D show an illustrative example of the ego-car 400 recognizing a fire truck 410 approaching from the rear by using a symbol projected on the road surface by another vehicle 700, but the present disclosure is not limited thereto.

As shown in FIG. 7A, the ego-car 400 may use a symbol 710 projected on the road surface by another vehicle 700 to determine the presence and emergency route of the fire truck 410 approaching from the rear. For example, when projection of the symbol 710 indicating a fire truck on the second lane is recognized, the ego-car 400 may determine that the fire truck 410 is approaching along the second lane. The ego-car 400 may determine an avoidance route for securing an emergency route of the fire truck 410 based on the recognized information.

The ego-car 400 may change lanes to the first lane as shown in FIG. 7B to secure an emergency route. At this time, the ego-car 400 may project onto the road surface a symbol 720 meaning to yield the right of way, informing the surrounding vehicles of the situation of the fire truck 410 approaching, and may effectively secure the emergency route for the fire truck 410.

As shown in FIG. 7C, in response to detecting that an emergency route is secured around the ego-car 400 with the cooperation of the surrounding vehicles, the ego-car 400 may project onto the road surface a symbol 730 indicating that the area is an emergency route for the fire truck 410 to prevent other vehicles from entering the emergency route for the fire truck 410. For example, the ego-car 400 may project the symbol 730 onto at least a part of the emergency route identified by the symbol 710 projected by the other vehicle 700, that is, at least a part of the second lane. Through the symbols 710 and 730 projected by the ego-car 400 and other vehicles 700, surrounding vehicles may recognize that the emergency vehicle is to travel on the second lane and may refrain from entering the second lane. Additionally, the fire truck 410 can easily determine that the second lane has been secured as an emergency route.

When the approach of the fire truck 410 is detected, the ego-car 400 may project a symbol 740 including a relative distance to the fire truck 410, as shown in FIG. 7D, to provide the surrounding vehicles with specific information about how close the fire truck 410 has approached. The ego-car 400 may be configured to directly recognize the fire truck 410 to determine the approach thereof and/or the relative distance thereto, but the present disclosure is not limited to such a configuration. For example, in some implementations, the ego-car 400 may calculate its relative distance to the fire truck 410 by adding the relative distance between the other vehicle 700 and the ego-car 400 to the relative distance between the other vehicle 700 and the fire truck 410, as determined through the symbol projected by the other vehicle 700. The ego-car 400 may then detect the approach of the fire truck 410 based on whether the calculated distance is within a predetermined threshold distance.

When projecting the symbols 720 and 740, the ego-car 400 may determine the shapes and/or projection positions of the symbols 720 to 740 to provide information consistent with information provided by the symbol 710 projected by the other vehicle 700. For example, when the other vehicle 700 projects onto the second lane the symbol 710 indicating that the fire truck is approaching, the ego-car 400 may also project onto the second lane the symbol 730 of the same or similar shape onto the second lane.

Figure 8C:
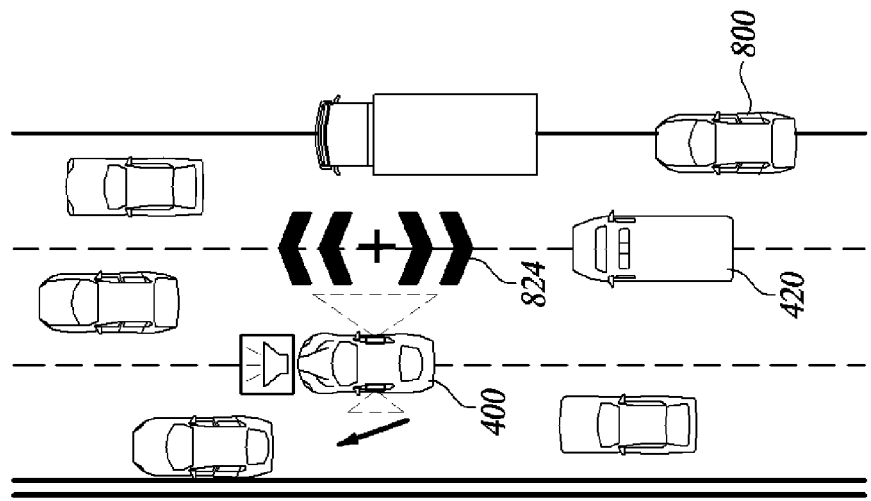
FIG. 8A to 8C are diagrams illustrating another example of vehicles providing surrounding vehicles with alarm messages about an emergency step by step.
Figure 8B:
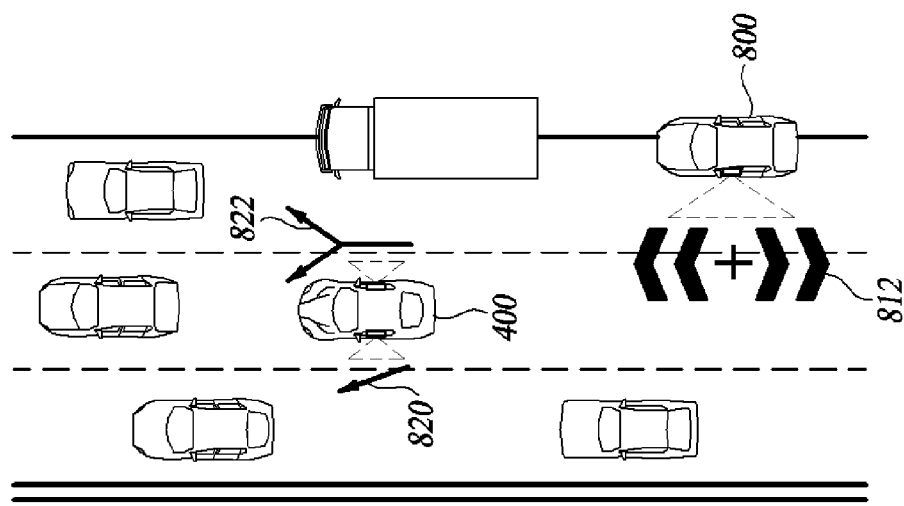
Figure 8A:
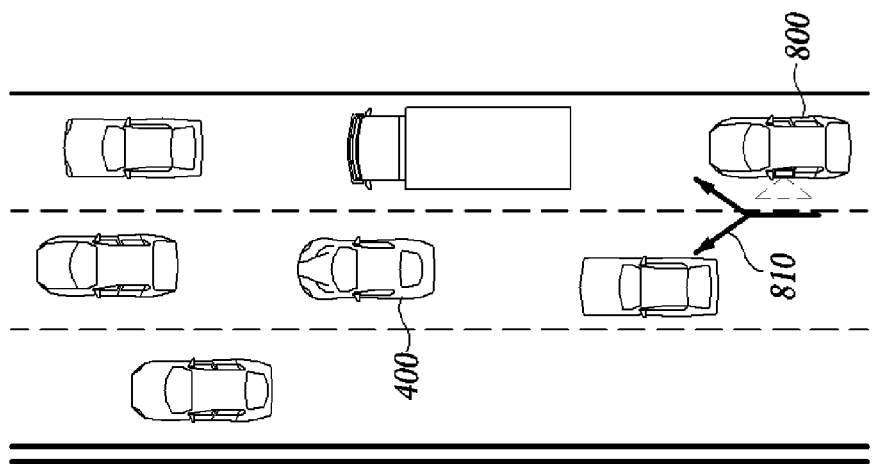

FIG. 8A to 8C are diagrams illustrating another example of vehicles providing surrounding vehicles with alarm messages about an emergency step by step.

FIG. 8A to 8C illustrate the ego-car 400 recognizing an ambulance 420 approaching from the rear right by using a symbol projected on the road surface by another vehicle 800, but the present disclosure is limited to this configuration.

As shown in FIG. 8A, the ego-car 400 may use a symbol 810 projected on the road surface by another vehicle 800 to recognize the presence of an emergency vehicle approaching from the rear and the direction the ego-car 400 needs to follow. For example, the ego-car 400 may recognize that it should veer to the left through the symbol 810 projected on the road by the other vehicle 800, and based on this, further detect a certain emergency vehicle approaching straddling the second lane and the third lane. The ego-car 400 may determine its avoidance route for securing an emergency route for the emergency vehicle based on the recognized information.

As shown in FIG. 8B, the ego-car 400 may inform the surrounding vehicles of the emergency vehicle approaching and the need to drive veering to the left or right to secure an emergency route for the emergency vehicle by projecting symbols 820 and 822 indicating the route for the surrounding vehicles to take. Meanwhile, another vehicle 800 may, in response to a detection that the emergency route is secured nearby, project onto the road surface a symbol 812 indicating that the relevant area is an emergency route for ambulance 420, to prevent other vehicles from entering the secured route. This allows the ego-car 400 to determine the type of emergency vehicle.

Similarly, as shown in FIG. 8C, when the ego-car 400 detects that an emergency route has been secured around it, the ego-car 400 may project onto the road surface a symbol 824 indicating the relevant area is an emergency route for the ambulance 420 to prevent other vehicles from entering the secured route. For example, the ego-car 400 may project the symbol 824 on at least some areas of the emergency route identified by the symbols 810 and 812 projected by the other vehicle 800, that is, at least some areas of the second lane and the third lane.

On the other hand, when the ambulance 420 is traveling in a congested section, an emergency route may not be fully secured even when the ego-car 400 and some surrounding vehicles drive veering to one side. At this time, the ego-car 400 may use the sound alarm unit 112 to provide additional guidance to surrounding vehicles.

When projecting symbols 820 to 824, the ego-car 400 may determine the shapes and/or projection positions of the symbols 820 to 824 to provide information consistent with information provided by the symbol 810 projected by the other vehicle 800. For example, when the other vehicle 800 projects the symbol 810 indicating that vehicles in the third lane should move to the right and vehicles in the first and second lanes should move to the left to secure an emergency route for the emergency vehicle, the ego-car 400 may also project the symbols 822 and 824 that may be interpreted to have the same meaning.

As described above, upon detecting that another vehicle is projecting predetermined information around the ego-car, the emergency-vehicle recognition apparatus may recognize information on the emergency vehicle based on the information projected by the other emergency-vehicle recognition apparatus and may project symbols and/or avoidance routes that provide information consistent with the recognized information. Accordingly, information on an emergency is sequentially propagated to nearby vehicles, so that vehicles that cannot immediately recognize an emergency vehicle may determine their avoidance route for securing an emergency route for the emergency vehicle.

While the above descriptions have been presented as operations performed by the ego-car 400, it should be noted that the emergency-vehicle recognition apparatus 10 provided in the ego-car 400 can perform the same or corresponding operations.

The apparatus or method according to the present disclosure may arrange the respective components to be implemented as hardware or software, or a combination of hardware and software. Additionally, each component may be functionally implemented by software, and a microprocessor may execute the function by software for each component when implemented.

Various implementations of the apparatuses, units, processes, steps, and the like described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or codes, contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Although the steps in the respective flowcharts/timing charts are described in the present specification as being sequentially performed, they merely instantiate the technical idea of some implementations of the present disclosure. Therefore, a person having ordinary skill in the pertinent art could perform the steps by changing the sequences described in the respective flowcharts/timing charts or by performing two or more of the steps in parallel, and hence the steps in the respective flowcharts/timing charts are not limited to the illustrated chronological sequences.

In some implementations, the emergency-vehicle recognition apparatus projects a symbol for an emergency to allow vehicles to quickly recognize an emergency vehicle approaching based on the projected symbol even in a situation where the vehicles cannot recognize the emergency vehicle due to obstacles.

In some implementations, the emergency-vehicle recognition apparatus shares emergency information with other emergency-vehicle recognition apparatuses by using V2X communications, allowing vehicles to travel toward an avoidance location based on the shared information even when they do not recognize the location of the emergency vehicle, quickly securing an emergency route.

The effects of the present disclosure are not limited to those mentioned above, and other unmentioned effects will be clearly understood by those skilled in the art from the above description.

What is claimed is:

1. An apparatus for recognizing an emergency vehicle, comprising:
    a processor; and
    a memory configured to store at least one instruction executed by the processor,
    wherein the processor is configured to:
        control at least one sensor to recognize an approach of the emergency vehicle and a road condition;
        determine a first avoidance location that is an avoidance location for a first car to move away from the emergency vehicle based on the road condition;
        provide a first avoidance route that is a route for the first car to move from a current location to the first avoidance location; and
        control at least one projection device to project, onto a road, at least one of a first symbol indicating the approach of the emergency vehicle or the first avoidance route to enable at least one other vehicle on the road to recognize the approach of the emergency vehicle and determine an avoidance location of the at least one other vehicle,
    wherein the approach of the emergency vehicle is recognized from a second symbol that is projected onto the road by a second vehicle and that indicates the approach of the emergency vehicle or a second avoidance route determined by the second vehicle, and wherein the first avoidance location is determined based on a direction indicated by the second symbol.

2. The apparatus of claim 1, wherein the processor is further configured to control a system for vehicle-to-everything (V2X) communication, based on communication with at least one of an emergency-vehicle recognition apparatus or an emergency situation control apparatus, to transmit the road condition and the first avoidance location and to receive an emergency route that is a fastest route for the emergency vehicle and a second avoidance location that is an avoidance location for the second vehicle, wherein the determining the first avoidance location comprises:

determining the first avoidance location based on at least one of the emergency route or the second avoidance location.

3. The apparatus of claim 1, wherein the processor is further configured to control at least one display to output a message indicating that the emergency vehicle is approaching.

4. The apparatus of claim 1, wherein the processor is further configured to control at least one speaker to output a message indicating that the emergency vehicle is approaching.

5. The apparatus of claim 1, wherein the first symbol comprises:

at least one of a relative distance or a direction of the emergency vehicle.

6. The apparatus of claim 1, wherein the processor is further configured to, in response to recognizing that the emergency vehicle has passed the first car, provide a guidance that an emergency is terminated and to return to normal driving.

7. The apparatus of claim 1, wherein the processor is further configured to recognize information regarding the emergency vehicle from the second symbol.

8. The apparatus of claim 7, wherein the information regarding the emergency vehicle includes at least one of a type of the emergency vehicle, a location of the emergency vehicle, an emergency route of the emergency vehicle, or a direction in which the first car is to be moved to secure the emergency route.

9. The apparatus of claim 7, wherein the at least one of the first symbol or the first avoidance route has a symbol shape and a projection position to provide, to one or more surrounding vehicles, information related to the information regarding the emergency vehicle.

10. A method of recognizing an emergency vehicle, the method comprising:

recognizing an approach of the emergency vehicle and a road condition by using at least one sensor;

determining a first avoidance location that is an avoidance location for a first car to move away from the emergency vehicle based on the road condition;

providing a first avoidance route that is a route for the first car to move from a current location to the first avoidance location; and projecting, onto a road by using at least one projection device, at least one of a first symbol indicating the approach of the emergency vehicle or the first avoidance route to enable at least one other vehicle on the road to recognize the approach of the emergency vehicle and determine an avoidance location of the at least one other vehicle, wherein the approach of the emergency vehicle is recognized from a second symbol that is projected onto the road by a second vehicle and that indicates the approach of the emergency vehicle or a second avoidance route determined by the second vehicle, and wherein the first avoidance location is determined based on a direction indicated by the second symbol.

11. The method of claim 10, further comprising:

transmitting the road condition to an emergency situation control apparatus, by using vehicle-to-everything (V2X) communication;

receiving, from the emergency situation control apparatus, an emergency route that is a fastest route for the emergency vehicle, by using the V2X communication;

receiving a second avoidance location that is an avoidance location for the second vehicle from another emergency-vehicle recognition apparatus, by using the V2X communication; and transmitting the first avoidance location to the another emergency-vehicle recognition apparatus, by using the V2X communication, wherein determining the first avoidance location based on at least one of the emergency route or the second avoidance location.

12. The method of claim 10, further comprising:

outputting a message indicating that the emergency vehicle is approaching by using at least one display.

13. The method of claim 10, further comprising:

outputting a voice message indicating that the emergency vehicle is approaching by using at least one speaker.

14. The method of claim 10, wherein the first symbol comprises:

at least one of a relative distance or direction of the emergency vehicle.

15. The method of claim 10, wherein providing the first avoidance route comprises:

based on a determination that the emergency vehicle has passed the first car, providing a guidance that an emergency is terminated and to return to normal driving.

16. The method of claim 10, wherein recognizing the approach of the emergency vehicle comprises:

recognizing information regarding the emergency vehicle from the second symbol.

17. The method of claim 16, wherein the at least one of the first symbol or the first avoidance route has a symbol shape and a projection position to provide to one or more surrounding vehicles information related to the information regarding the emergency vehicle.

18. The apparatus of claim 1, wherein the first symbol is projected to a surface of the road in a forward direction or a backward direction relative to the first car.

19. The method of claim 10, wherein the first symbol is projected to a surface of the road in a forward direction or a backward direction relative to the first car.

* * * * *